US009264684B2

(12) United States Patent
Nenonen

(10) Patent No.: US 9,264,684 B2
(45) Date of Patent: Feb. 16, 2016

(54) COLOUR BALANCE PROCESSOR

(71) Applicant: Nokia Corporation, Espoo (FI)

(72) Inventor: Petri Nenonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/332,947

(22) Filed: Jul. 16, 2014

(65) Prior Publication Data

US 2015/0029359 A1 Jan. 29, 2015

(30) Foreign Application Priority Data

Jul. 24, 2013 (GB) .................................. 1313174.3

(51) Int. Cl.
*H04N 9/73* (2006.01)
*H04N 5/235* (2006.01)
*H04N 1/60* (2006.01)

(52) U.S. Cl.
CPC ............. *H04N 9/735* (2013.01); *H04N 1/6077* (2013.01); *H04N 5/2354* (2013.01)

(58) Field of Classification Search
CPC ...................................................... H04N 1/6086
USPC ....................................................... 348/224.1
See application file for complete search history.

(56) References Cited

U.S. PATENT DOCUMENTS

| 4,918,519 | A | 4/1990 | Suzuki et al. |
| 5,568,194 | A | 10/1996 | Abe |
| 2005/0093997 | A1 | 5/2005 | Dalton et al. |
| 2005/0243175 | A1 | 11/2005 | Yamada et al. |
| 2006/0012689 | A1 | 1/2006 | Dalton et al. |
| 2006/0050335 | A1 | 3/2006 | Dorrell et al. |
| 2007/0201853 | A1 | 8/2007 | Petschnigg |
| 2007/0248342 | A1 | 10/2007 | Tamminen et al. |
| 2010/0208099 | A1* | 8/2010 | Nomura ..................... 348/223.1 |
| 2011/0297828 | A1 | 12/2011 | Weisbach et al. |
| 2012/0281110 | A1 | 11/2012 | Ogawa |

FOREIGN PATENT DOCUMENTS

| JP | 2000-069488 A | 3/2000 |
| JP | 2004-158917 A | 6/2004 |
| JP | 2011-044788 A | 3/2011 |
| JP | 2012-039186 A | 2/2012 |

OTHER PUBLICATIONS

Hsu et al., "Light Mixture Estimation for Spatially Varying White Balance", ACM Transactions on Graphics (TOG)—Proceedings of ACM SIGGRAPH, vol. 27 Issue 3, Aug. 2008, 7 pages.
Search Report received for corresponding United Kingdom Patent Application No. 1313174.3, dated Feb. 14, 2014, 5 pages.
Extended European Search Report received for corresponding European Patent Application No. 14177194.9, dated Nov. 28, 2014, 11 Pages.

* cited by examiner

*Primary Examiner* — James Hannett
(74) *Attorney, Agent, or Firm* — Nokia Technologies Oy

(57) ABSTRACT

The color distortion of an image caused by improper white balance when illuminated using a dual light source can be alleviated by masking a weighted central area of the image, and then determining an impact metric indicating the combined impact of the brightness and pixel color components for the masked weighted central area.

16 Claims, 7 Drawing Sheets

COLOUR BALANCE PROCESSOR

FIELD OF THE APPLICATION

The present application relates to a method and apparatus for processing a colour image when captured using a strobe or flash.

BACKGROUND

Photographing an object or scene under low ambient light conditions may require additional light, such as light provided by a flash or strobe. The additional light provided by the flash or strobe may result in colour distortion in the photographed image. The colour distortion may be caused by the flash or strobe illuminating the photographic scene with a different colour of light to that of ambient light.

For example, a scene which may be illuminated with an incandescent light may not be bright enough for photography. In such instances the scene may be further illuminated with an additional light source in the form of a strobe or flash such as a Light Emitting Diode (LED) source. However, such an additional light source can have a different spectral content (or colour temperature) which can have an effect on the colours within the image. For example, a scene containing white walls may be reproduced with a yellow tinge when illuminated by a secondary light source. Furthermore, other colours in the image may also be affected by the colour of the secondary light source.

The consequence of illuminating a photographic scene with a dual light source comprising ambient light and flash light may be attributed to an improper white balance between the light sources.

SUMMARY OF VARIOUS EXAMPLES

This application therefore proceeds from the consideration that when a scene is illuminated by a dual light source there may be a change in some of the colours within the photographed scene which may at least in part be attributable to an improper white balance between the light sources.

There is provided according to a first aspect a method comprising: capturing an image with a flash; forming at least one weighted masked area of the image by masking at least one area of the image with a weighting mask; and determining an impact metric indicating the combined impact of the brightness and pixel colour components for the at least one weighted masked area.

The at least one weighted masked area may mask a central area of pixels of the image, and the method as described herein may further comprises masking at least one further area of pixels of the image by weighting the at least one further area with a further weighting mask to form a further weighted masked area.

The method may further comprise: determining an average brightness measure and an average maximum pixel colour component value for the central weighted masked area; determining an average brightness value and an average maximum pixel colour component value for the at least one further weighted masked area; and determining the impact metric by combining the average brightness measure and average maximum pixel colour component value relating to the central weighted masked area and combining the average brightness measure and average maximum pixel colour component value relating to the at least one further weighted masked area.

The at least one further weighted masked area may be a weighted masked area of the at least one weighted masked area which has a maximum value of the combined brightness measure and maximum pixel colour component value.

The method may further comprises combining an average impact value for mask weighted areas of the image with the impact metric, the average impact value may comprise the average of the combined brightness and maximum pixel colour component value relating to the central weighted masked area and the combined brightness and maximum colour component value relating to the at least one further weighted masked area.

The method may further comprise matching the impact metric to a specific flash and camera module via a matching curve.

The method may further comprise using the matched impact metric to correct the colour balance of the image.

The maximum pixel colour component value may be a maximum magnitude of either one of; red pixel component, green pixel component or blue pixel component.

The method may further comprise discarding the pixels of the at least one weighted masked area depending on whether the ratio of the number of saturated pixels of the at least one weighted masked area relative to the area of the at least one masked area is above a pre-determined threshold value.

According to a second aspect of there is provided an apparatus configured to: capture an image with a flash; form at least one weighted masked area of the image by masking at least one area of the image with a weighting mask; and determine an impact metric indicating the combined impact of the brightness and pixel colour components for the at least one weighted masked area.

The at least one weighted masked area may mask a central area of pixels of the image, and the apparatus as described herein may be further configured to mask at least one further area of pixels of the image by weighting the at least one further area with a further weighting mask to form a further weighted masked area.

The apparatus may be further configured to: determine an average brightness measure and an average maximum pixel colour component value for the central weighted masked area; determine an average brightness value and an average maximum pixel colour component value for the at least one further weighted masked area; and determine the impact metric by combining the average brightness measure and average maximum pixel colour component value relating to the central weighted masked area and combining the average brightness measure and average maximum pixel colour component value relating to the at least one further weighted masked area.

The at least one further weighted masked area may be a weighted masked area of the at least one weighted masked area which has a maximum value of the combined brightness measure and maximum pixel colour component value.

The apparatus may be further configured to combine an average impact value for mask weighted areas of the image with the impact metric, the average impact value may comprise the average of the combined brightness and maximum pixel colour component value relating to the central weighted masked area and the combined brightness and maximum colour component value relating to the at least one further weighted masked area.

The apparatus may be further configured to match the impact metric to a specific flash and camera module via a matching curve.

The apparatus may be further configured to use the matched impact metric to correct the colour balance of the image.

The maximum pixel colour component value may be a maximum magnitude of either one of; red pixel component, green pixel component or blue pixel component.

The apparatus may be further configured to discard the pixels of the at least one weighted masked area depending on whether the ratio of the number of saturated pixels of the at least one weighted masked area relative to the area of the at least one masked area is above a pre-determined threshold value.

There is according to a third aspect an apparatus comprising at least one processor and at least one memory including computer program code for one or more programs, the at least one memory and the computer program code configured to, with the at least one processor, cause the apparatus to perform at least: capture an image with a flash; form at least one weighted masked area of the image by masking at least one area of the image with a weighting mask; and determine an impact metric indicating the combined impact of the brightness and pixel colour components for the at least one weighted masked area.

The at least one weighted masked area may mask a central area of pixels of the image, and the apparatus is further caused to mask at least one further area of pixels of the image by weighting the at least one further area with a further weighting mask to form a further weighted masked area.

The apparatus may be further caused to: determine an average brightness measure and an average maximum pixel colour component value for the central weighted masked area; determine an average brightness value and an average maximum pixel colour component value for the at least one further weighted masked area; and determine the impact metric by combining the average brightness measure and average maximum pixel colour component value relating to the central weighted masked area and combining the average brightness measure and average maximum pixel colour component value relating to the at least one further weighted masked area.

The at least one further weighted masked area may be a weighted masked area of the at least one weighted masked area which has a maximum value of the combined brightness measure and maximum pixel colour component value.

The apparatus may be further caused to: combine an average impact value for mask weighted areas of the image with the impact metric, the average impact value may comprise the average of the combined brightness and maximum pixel colour component value relating to the central weighted masked area and the combined brightness and maximum colour component value relating to the at least one further weighted masked area.

The apparatus may be further caused to match the impact metric to a specific flash and camera module via a matching curve.

The apparatus may be further caused to use the matched impact metric to correct the colour balance of the image.

The maximum pixel colour component value may be a maximum magnitude of either one of; red pixel component, green pixel component or blue pixel component.

The apparatus may be further caused to discard the pixels of the at least one weighted masked area depending on whether the ratio of the number of saturated pixels of the at least one weighted masked area relative to the area of the at least one masked area is above a pre-determined threshold value.

A computer program product may comprise at least one computer readable non-transitory medium having program code stored thereon, the program code, when executed by an apparatus, causing the apparatus at least to perform the method as described herein.

An electronic device may comprise apparatus as described herein.

A chipset may comprise apparatus as described herein.

For a better understanding of the present application and as to how the same may be carried into effect, reference will now be made by way of example to the accompanying drawings in which:

EMBODIMENTS OF THE APPLICATION

Figure 1:
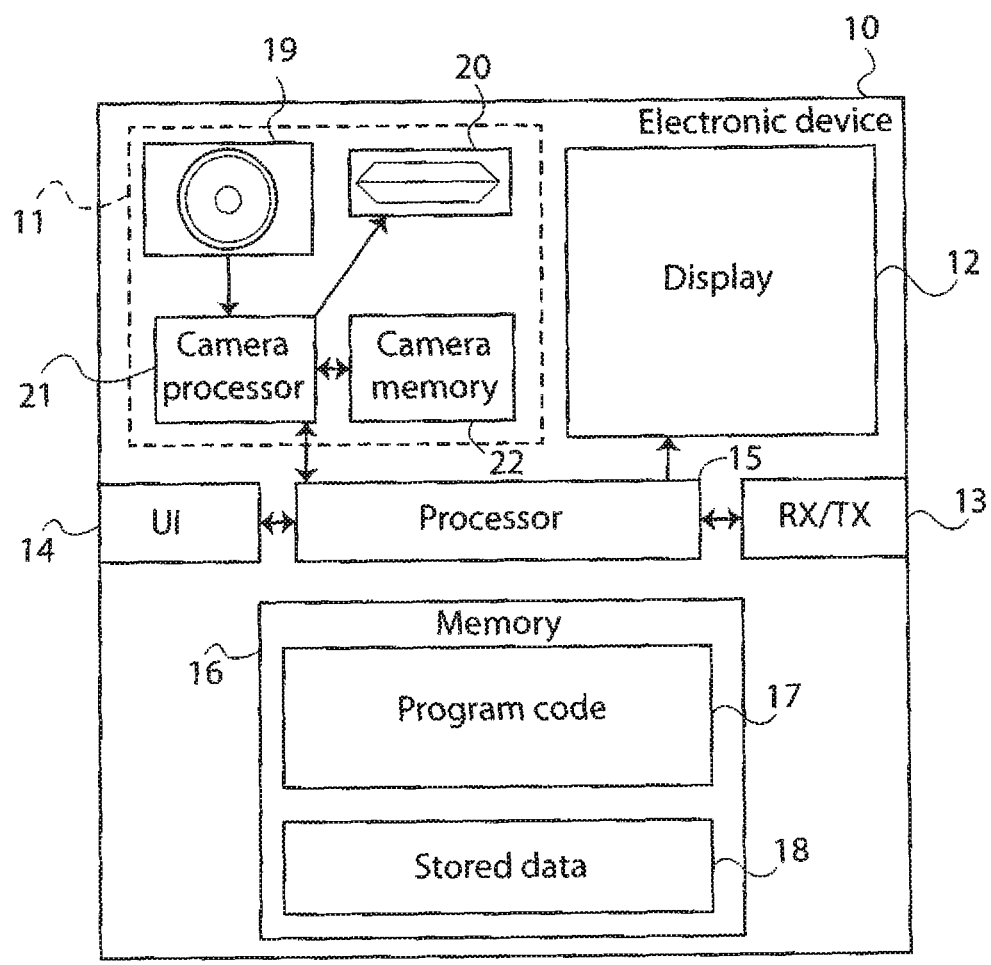
FIG. 1 shows a schematic representation of an apparatus suitable for implementing some example embodiments.

The application describes apparatus and methods for correcting the colour balance in an image when the image is captured using a dual light source. The embodiments described hereafter may be utilised in various applications and situations where several images of the same scene are captured and stored. For example, such applications and situations may include capturing two subsequent images, one with flash light and another without.

The following describes apparatus and methods for colour processing in a photographed image in order to balance the effects of flash and ambient illumination on the original photographed scene. In this regard reference is first made to FIG. 1 which discloses a schematic block diagram of an exemplary electronic device 10 or apparatus. The electronic device is configured to perform colour balancing techniques according to some embodiments of the application.

The electronic device 10 is in some embodiments a mobile terminal, mobile phone or user equipment for operation in a wireless communication system. In other embodiments, the electronic device is a digital camera.

The electronic device 10 comprises an integrated camera module 11, which is coupled to a processor 15. The processor 15 is further coupled to a display 12. The processor 15 is further coupled to a transceiver (TX/RX) 13, to a user interface (UI) 14 and to a memory 16. In some embodiments, the camera module 11 and/or the display 12 is separate from the electronic device and the processor receives signals from the camera module 11 via the transceiver 13 or another suitable interface.

The processor 15 may be configured to execute various program codes 17. The implemented program codes 17, in some embodiments, comprise image capture digital processing or configuration code. The implemented program codes 17 in some embodiments further comprise additional code for further processing of images. The implemented program codes 17 may in some embodiments be stored for example in the memory 16 for retrieval by the processor 15 whenever needed. The memory 15 in some embodiments may further provide a section 18 for storing data, for example data that has been processed in accordance with the application.

The camera module 11 comprises a camera 19 having a lens for focusing an image on to a digital image capture means such as a charged coupled device (CCD). In other embodiments the digital image capture means may be any suitable image capturing device such as complementary metal oxide semiconductor (CMOS) image sensor. The camera module 11 further comprises a flash lamp 20 for illuminating an object during the capture of an image of the object. The flash 20 is coupled to the camera processor 21. The camera 19 is also coupled to a camera processor 21 for processing signals received from the camera. The camera processor 21 is coupled to camera memory 22 which may store program codes for the camera processor 21 to execute when capturing an image. The implemented program codes (not shown) may in some embodiments be stored for example in the camera memory 22 for retrieval by the camera processor 21 whenever needed. In some embodiments the camera processor 21 and the camera memory 22 are implemented within the apparatus 10 processor 15 and memory 16 respectively.

In embodiments the flash 20 may comprise one or more light emitting diodes (LEDs). In other embodiments the flash may comprise a Xenon based lamp.

The user interface 14 in some embodiments enables a user to input commands to the electronic device 10, for example via a keypad, user operated buttons or switches or by a touch interface on the display 12. One such input command may be to start a frame image capture process by for example the pressing of a 'shutter' button on the apparatus. Furthermore the user may in some embodiments obtain information from the electronic device 10, for example via the display 12 of the operation of the apparatus 10. For example the user may be informed by the apparatus that frame image capture process is in operation by an appropriate indicator on the display. In some other embodiments the user may be informed of operations by a sound or audio sample via a speaker (not shown), for example the same frame image capture operation may be indicated to the user by a simulated sound of a mechanical lens shutter.

The transceiver 13 enables communication with other electronic devices, for example in some embodiments via a wireless communication network.

It is to be understood again that the structure of the electronic device 10 could be supplemented and varied in many ways.

A user of the electronic device 10 may use the camera module 11 for capturing images to be transmitted to some other electronic device or that is to be stored in the data section 18 of the memory 16. A corresponding application in some embodiments may be activated to this end by the user via the user interface 14. This application, which may in some embodiments be run by the processor 15, causes the processor 15 to execute the code stored in the memory 16.

The processor 15 can in some embodiments process the digital image in the same way as described with reference to FIG. 2.

The resulting image can in some embodiments be provided to the transceiver 13 for transmission to another electronic device. Alternatively, the processed digital image could be stored in the data section 18 of the memory 16, for instance for a later transmission or for a later presentation on the display 10 by the same electronic device 10.

The electronic device 10 can in some embodiments also receive digital images from another electronic device via its transceiver 13. In these embodiments, the processor 15 executes the processing program code stored in the memory 16. The processor 15 may then in these embodiments process the received digital images in the same way as described with reference to FIG. 2. Execution of the processing program code to process the received digital images could in some embodiments be triggered as well by an application that has been called by the user via the user interface 14.

Figure 2:
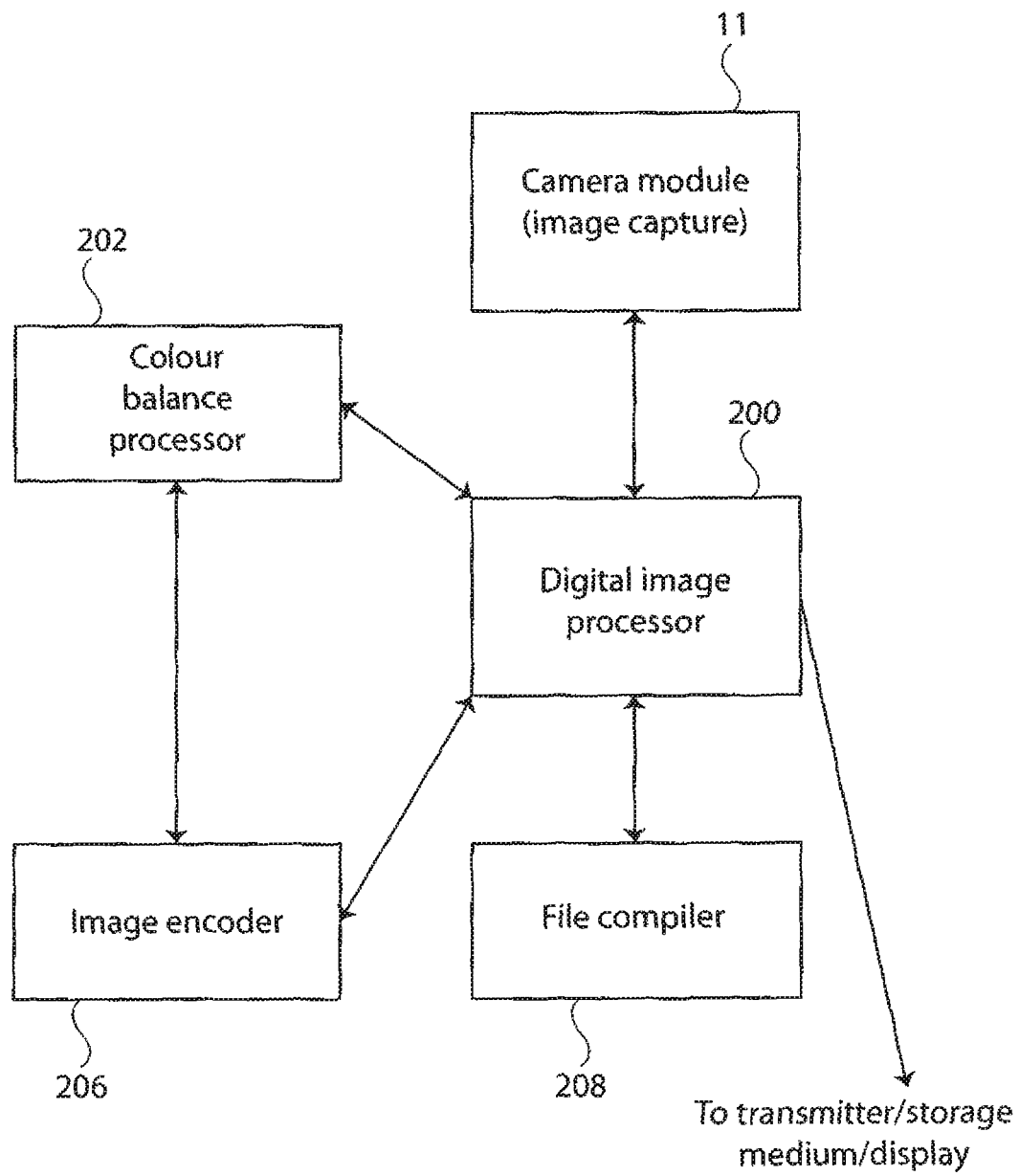
FIG. 2 shows a schematic representation of apparatus according to example embodiments.
Figure 3:
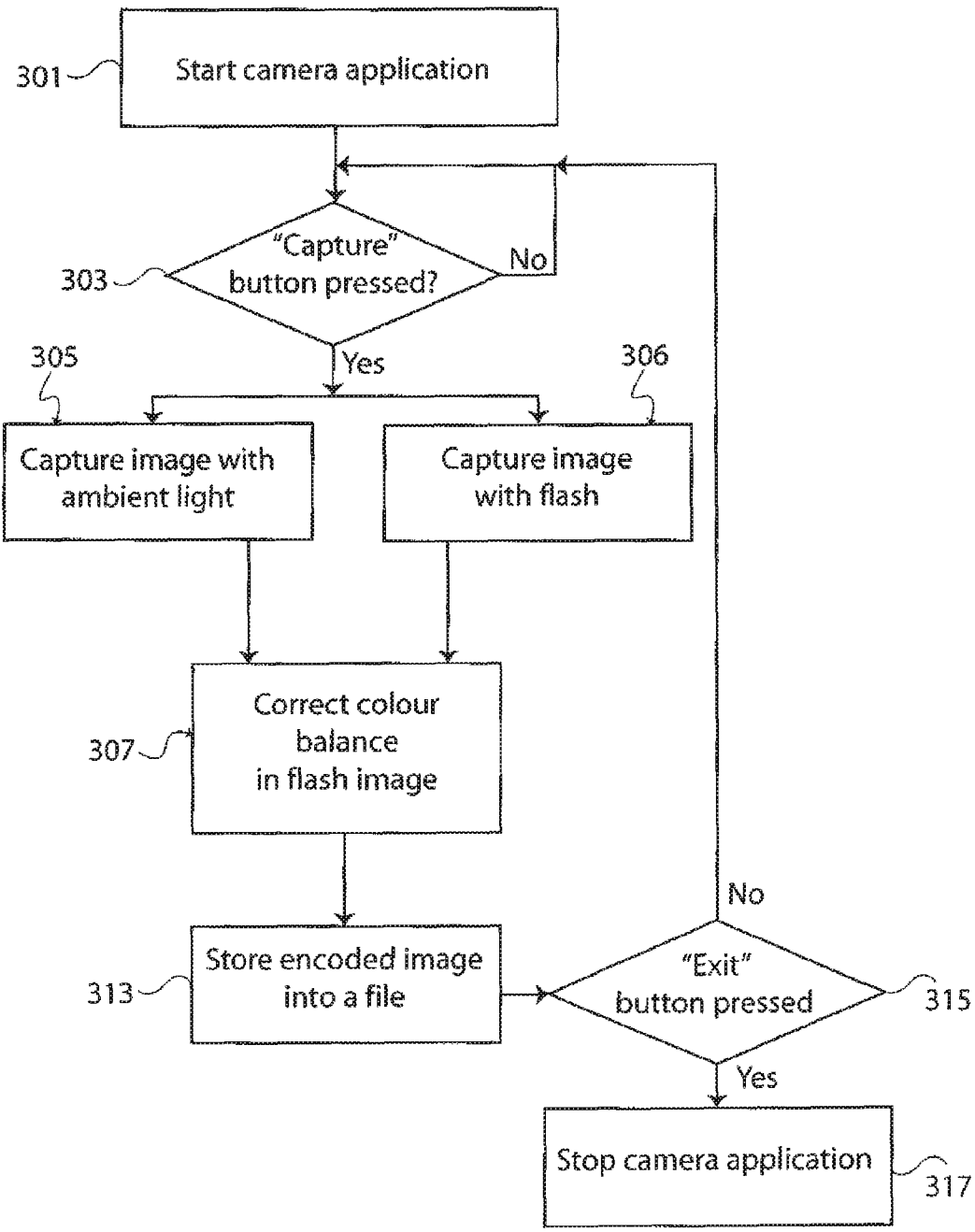
FIG. 3 shows a flow diagram of the processes carried out according to some example embodiments.
Figure 5:
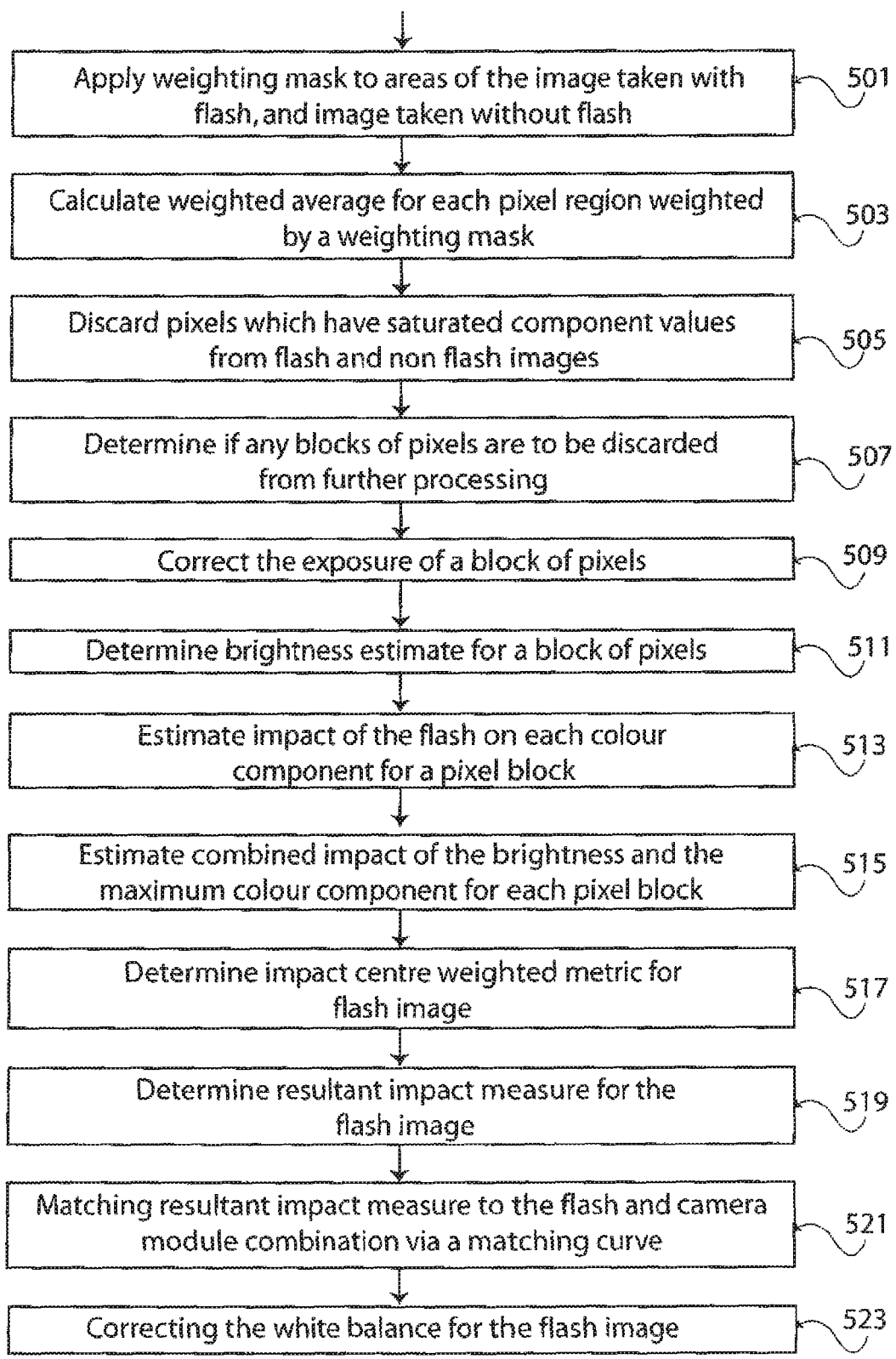
FIG. 5 shows a flow diagram further detailing some processes carried out by some example embodiments.

It would be appreciated that the schematic structures described in FIG. 2 and the method steps in FIGS. 3 and 5 represent only a part of the operation of a complete system comprising some embodiments of the application as shown implemented in the electronic device shown in FIG. 1.

FIG. 2 shows a schematic configuration for a digital colour image processing apparatus according to at least one embodiment. The digital colour image processing apparatus may include a camera module 11, digital image processor 200, a colour balance processor 202 and a file compiler 210.

In other embodiments of the digital image processor 200 may be the "core" element of the digital colour image processing apparatus and other parts or modules may be added or removed dependent on the current application. In other embodiments, the parts or modules represent processors or parts of a single processor configured to carry out the processes described below, which are located in the same, or different chip sets. Alternatively the digital image processor 200 is configured to carry out all of the processes and FIG. 2 exemplifies the processing and encoding of the multi-frame images.

The operation of the digital colour image processing apparatus parts according to at least one embodiment will be described in further detail with reference to FIG. 3. Where elements similar to those shown in FIG. 1 are described, the same reference numbers are used.

The camera module 11 may be initialised by the digital image processor 200 in starting a camera application. As has been described previously, the camera application initialisation may be started by the user inputting commands to the electronic device 10, for example via a button or switch or via the user interface 14.

When the camera application is started, the apparatus 10 can start to collect information about the scene and the ambiance. At this stage, the different settings of the camera module 11 can be set automatically if the camera is in the automatic mode of operation. For the example of a wide-exposure frame digital image the camera module 11 and the digital image processor 200 may determine the exposure times of the captured images based on a determination of the image subject. Different analogue gains or different exposure values can be automatically detected by the camera module 11 and the digital image processor 200. Where, the exposure value is the combination of the exposure time and analogue gain.

The focus setting of the lens can be similarly determined automatically by the camera module 11 and the digital image processor 200. In some embodiments the camera module 11 can have a semi-automatic or manual mode of operation where the user may via the user interface 14 fully or partially choose the camera settings which the frame image will operate. Examples of such settings that could be modified by the user include a manually focusing, zooming, choosing a flash mode setting for operating the flash 20, selecting an exposure level, selecting an analogue gain, selecting an exposure value, selecting auto white balance, or any of the settings described above.

Furthermore, when the camera application is started, the apparatus 10 for example the camera module 11 and the digital image processor 200 may further automatically determine the number of images or frames that will be captured and the settings used for each images. This determination can in some embodiments be based on information already gathered on the scene and the ambiance. In other embodiments this determination can be based on information from other sensors, such as an imaging sensor, or a positioning sensor capable of locating the position of the apparatus. Examples of such positioning sensor are Global positioning system (GPS) location estimators and cellular communication system location estimators, and accelerometers.

In some embodiments, the user may modify or choose these settings and so can define manually the number of images to be captured and the settings of each of these images or a range defining these images.

The initialisation or starting of the camera application within the camera module 11 is shown in FIG. 3 by the step 301.

The digital image processor 200 in some embodiments can then perform a polling or waiting operation where the processor waits to receive an indication to start capturing images. In some embodiments of the invention, the digital image processor 300 awaits an indicator signal which can be received from a "capture" button. The capture button may be a physical button or switch mounted on the apparatus 10 or may be part of the user interface 14 described previously.

While the digital image processor 200 awaits the indicator signal, the operation stays at the polling step. When the digital image processor 200 receives the indicator signal (following the pressing of the capture button), the digital image processor can communicate to the camera module 11 to start to capture images dependent on the settings of the camera module as determined in the starting of the camera application operation. The processor in some embodiments can perform an additional delaying of the image capture operation where in some embodiments a timer function is chosen and the processor can communicate to the camera module to start capturing images at the end of timer period.

The polling step of waiting for the capture button to be pressed is shown in FIG. 3 by step 303.

On receiving the signal to begin capturing images from the digital image processor 200, the camera module 11 then captures images as determined by the previous setting values.

In general embodiments may capture images of the same scene with different lighting conditions. For example, the first image may be captured with ambient lighting (where ambient lighting may be typically generated by a light source that remains constant during the capture process) and the second image may be captured with the addition of a known light source such as the flash 20.

One or more image pairs may be captured by the camera module 11, a first image of each image pair may be captured with the aid of the illuminating light from the flash 20, and the other image maybe captured without the flash 20. In embodiments the pair of images may be captured over a relatively short time interval in order to minimise the motion between the camera and the subject matter of the image.

The camera module 11 may then pass the captured image data to the digital image processor 200.

The operation of capturing multiple images comprising at least one image captured with flash and another image captured without flash is shown in FIG. 3 by processing steps 305 and 306.

The digital image processor 200 in some embodiments can then pass the captured image data to the colour balance processor 202 where the influence of the flash on the colour of the captured images may be reduced.

The operation of the colour balancing processor 202 will hereafter be described in more detail by reference to the processing steps in FIG. 5.

The colour balance processor 202 may be arranged to apply weighted masking to areas of the image. In a first group of embodiments the weighted masking may be applied to a number of different areas within the image. In other words there may be a number of individual masks applied over the image, in which a particular individual mask of the number of individual mask is applied to a particular area of the image.

For example in the first group of embodiments there may be one or more weighted mask applied to a central area of the image, and further individual weighted masks applied to different areas of the image which are offset from the centre.

Figure 4:
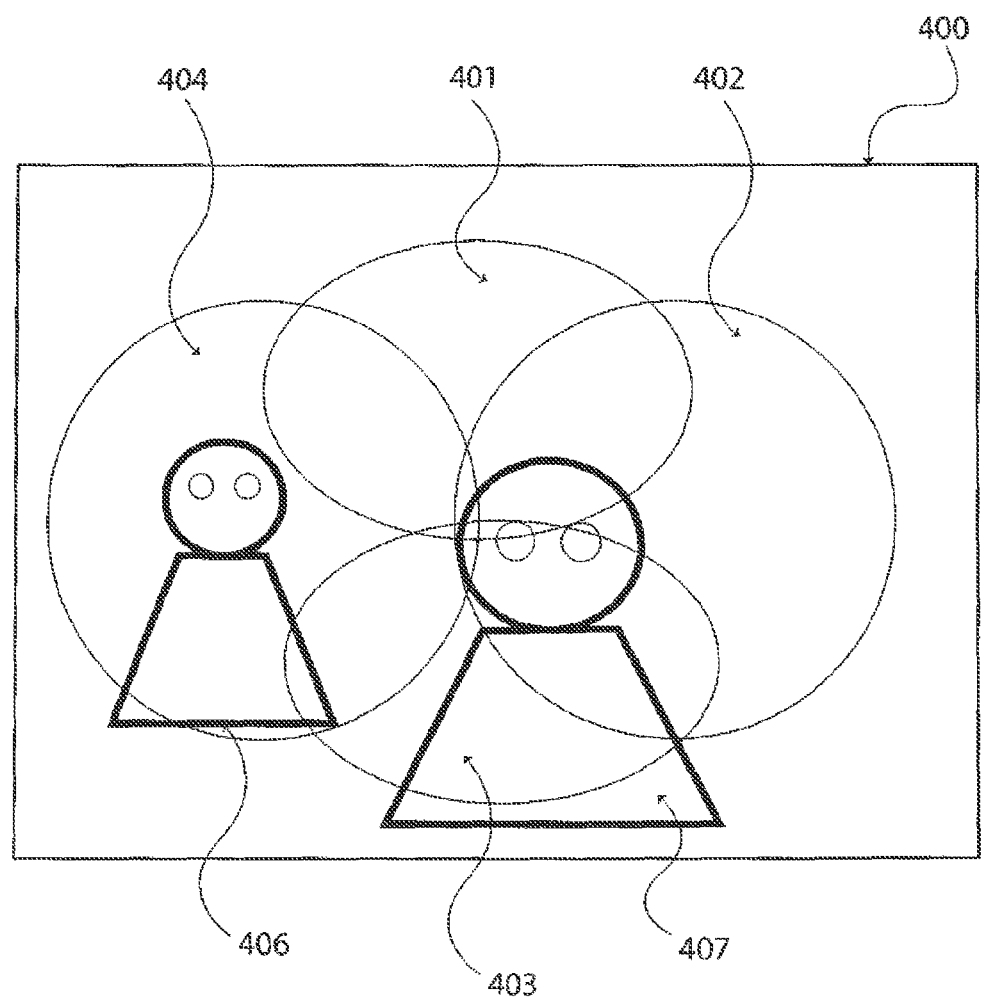
FIG. 4 shows schematically an example arrangement or weighted masks on an image.

With reference to FIG. 4, there is shown an arrangement of four individual weighted masks 401, 402, 403 and 404 placed over an image 400 comprising two objects of interest 406 and 407.

It may be seen from FIG. 4, that the arrangement of masks have been advantageously arranged to cover the central portion of the image thereby covering the majority of objects of interest in the image.

It is to be appreciated in embodiments that adopting an approach of having multiple weighted masks allows different areas of the image to be weighted differently. Furthermore applying multiple weighted masks also allows areas of the image to be weighted in a more flexible manner.

In the first group of embodiments the distribution of the weighting function within each mask may be arranged such that a higher weighting is applied to the pixels towards the centre of the weighting mask. In other words the image pixels at the centre of the mask may be weighted more than image pixels covered by the periphery of the mask.

It is to be appreciated in embodiments that having a weighting mask in which the weighting is distributes more towards the centre of the mask may have the advantage of reducing any adverse effects resulting from the miss-alignment of a moving object between the pair of consecutively taken images 305 and 306.

It is to be understood that in all groups of embodiments the weighting mask may be applied to both images of the image pair 305, 306. In other words the weighting image may be applied to both the image of the scene taken with the flash 20 and the consecutively taken image of the scene taken without the flash 20.

The step of applying a weighting mask to pixels of both the image taken with the flash 20 and the image taken without the flash 20 is shown as processing step 501 in FIG. 5.

In a further stage the colour balance processor 202 may then calculate the weighted mask average for each pixel within each weighted mask applied to the image. This may performed on a colour component basis for each weighted pixel. In other words the weighted mask average may be determined for each red (R), green (G) and blue (B) component of a pixel position weighted by a weighting mask.

It is to be appreciated that other embodiments may use other colour formats, for example the YUV format.

In embodiments the step of determining the weighted mask average for each pixel position component may be determined by replacing each pixel position which lies within the region of the weighted mask by a weighted average of its neighbourhood pixels. The weighted mask average for each pixel component within the region of a mask may be generally expressed as $X_m[i] = \Sigma_{(k,l) \in w} a_{k,l} y(m-k, n-l)$, where y(m, n) are the average (filtered) weighted pixel component and pixel component at image position m, n, which corresponds to the centre of the weighted mask w is a suitable chosen window, and $a_{k,l}$ are the filter weights. $X_m[i]$ is the ith area of pixels over which the weighting mask is applied, X and y are drawn from the set of pixel component values It is to be understood from hereon that the term block of pixels refers to the group of pixels over which the weighting mask is applied.

It is to be understood in embodiments that the step of determining the weighted mask average may be performed for pixels components of both the image taken with the flash and the image taken without the flash.

The step of determining the average weighted pixel component value for each pixel position within the region of a weighting mask is shown as processing step 503 in FIG. 5.

In embodiments pixels from both images may then be checked for component values which are saturated. If it is determined that pixels from either image have component values which are saturated then the respective pixel may be discarded from further processing by the colour balance processor 302.

The step of determining whether the image taken with the flash or the image taken without flash comprise pixels with saturated components values is shown as processing step 505 in FIG. 5.

Further, in embodiments all pixels which have been weighted by a particular weighting mask may also be disregard as a block from further processing. The block of pixels may be disregarded from further processing based upon the criterion whether the number of saturated pixels of said pixels weighted by a particular weighting mask is deemed to be above an allowable saturation threshold. In embodiments the threshold may be made relative to the area or number of pixels covered by the weighting mask, thereby normalising the number of saturated pixels to the total number of pixels over which the weighting mask is applied.

The allowable saturation threshold may be determined as being a value which lies between a number which is a minimum number of saturated pixels as a ratio to the size (or area covered by) of the weighting mask for all weighting masks applied to the images and a multiple of said minimum number. In other words if MinBlockSat denotes a minimum number of saturated pixels as a ratio to the size (or area covered by) of the weighting mask for all weighting masks, then MinBlockSat maybe expressed as $$MinBlockSat = \text{Min}\left(\frac{SatCount(i)}{masksize(i)}, \text{for all weighting masks } i\right),$$

where SatCount(i) denotes the number of saturated pixels within the region of weighting mask i, masksize(i) denotes the size in number of pixels of the weighting mask i, and Min( ) denotes the minimum function, that is the minimum value is selected for all values entering the function.

The allowable saturation threshold SatThresh value for the pair of images 305 and 306 may then be set as a number lying between MinBlockSat and a multiple M of MinBlockSat, in other words SatThresh can have a value between MinBlockSat and M*MinBlockSat. With M being a tuneable predetermined value.

In a first group of embodiments the SatThresh value may be set to lie at the midpoint between MinBlockSat and M*MinBlockSat.

Further groups of embodiments may set the SatThresh value to lie at other values between MinBlockSat and M*MinBlockSat. For example, other embodiments may arrange for the SatThresh value to lie at 25% or 75% of the distance between MinBlockSat and M*MinBlockSat.

In some embodiments there may be a further constraint added, whereby the value of M*MinBlockSat is limited to 1.

According to embodiments the block pixels as weighted by a particular mask may then be disregarded from further processing depending on whether the number of saturated pixels within the block of pixels weighted by the particular mask is greater that the saturation threshold value SatThresh, the number of saturated pixels being normalised to the size of the weighted block of pixels. In other words the block of pixels associated with the weighting mask i will be disregarded if $$\frac{SatCount(i)}{masksize(i)} > SatThresh$$

Figure 6:
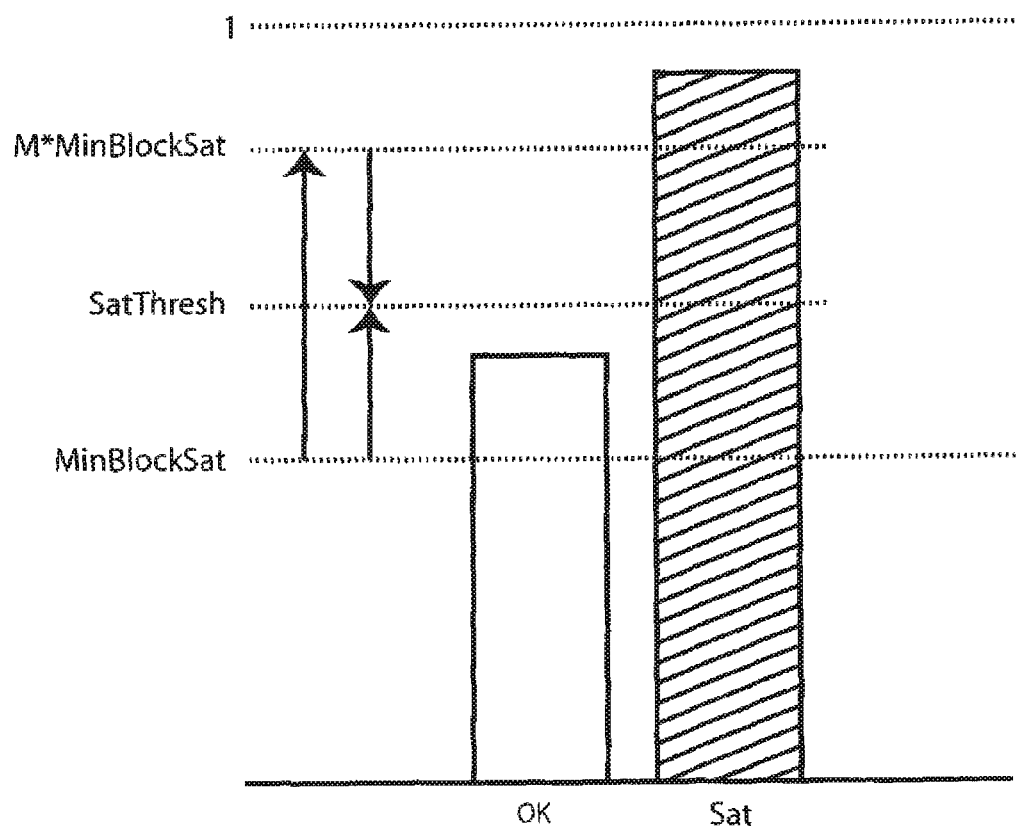
FIG. 6 depicts the process of discarding blocks of pixels from further processing carried out by some example embodiments.

The process of discarding from further processing a block of pixels weighted by a particular weighting mask may be visualised in FIG. 6 as a series of bar charts.

With reference to FIG. 6, 601 is a bar chart depicting a number of saturated pixels within a block of pixels weighted by a particular mask, where the number of saturated pixels is normalised to the size of the mask. In this instance it may be seen that the depicted number of saturated pixels is below the saturation threshold value SatThresh, and accordingly the associated block of pixels may be retained for further processing.

With further reference to FIG. 6, there is a further bar chart 602 which depicts a number of saturated pixels within a further block of pixels weighted by a further mask, where the number of saturated pixels is normalised to the size of the further mask. In this instance the depicted number of saturated pixels is above the saturation threshold value SatThresh, and accordingly the block of pixels associated with the depicted number of saturated pixels may be disregarded from further processing.

The step of determining whether a block of pixels will be disregarded from further processing is shown as processing step 507 in FIG. 5.

The colour balance processor 202 may then be arranged to correct the magnitude of each colour component of the non-flash image for the exposure of the flash image by the following expression $X_c = (X_m * Et_f * Ag_f * Dg_f)/(Et_{nf} * Ag_{nf} * Dg_{nf})$, where $X_m \in \{R_m, G_m, B_m\}$.

$Et_f$ and $Et_{nf}$ are the exposure times for the flash image and non-flash image respectively, $Ag_f$ and $Ag_{nf}$ are the analogue gains for the flash image and non-flash image respectively, $Dg_f$ and $Dg_{nf}$ are the digital gains for the flash image and non-flash image respectively, $X_m$ is the weighted mean value due to the weighted masking of the area of pixels of a colour component (R, G, B) of the pixels within a block of pixels of the non-flash image, and $X_c$ is the exposure compensated value for X.

The above equation may be applied to each colour components R, G, B in turn. Furthermore the above expression may be also applied in turn to each block of pixels within the non-flash image, in other words to each mask weighted group of pixels. Thereby resulting in the exposure compensated colour components $R_c$, $G_c$ and $B_c$. for the three colour components R, G, B.

The step of correcting the exposure for a block of pixels within the non-flash image for the exposure of the corresponding block of pixels within the flash image is shown as processing step 509 in FIG. 5.

The colour balance processor 302 may then be arranged to calculate a brightness impact estimate for each block of pixels within the flash and non-flash image.

The brightness impact estimate Br for a block of pixels of the flash or non-flash image may be determined as $$Br[i]=(R_m[i]+G_m[i]+B_m[i])/3$$

Where $R_m[i]$ is the weighted mean value (from processing step 503) of the Red component of the pixels in the ith block of pixels, $G_m[i]$ is the weighted mean value (from processing step 503) of the green component of the pixels in the ith block of pixels, $B_m[i]$ is the weighted mean value (from processing step 503) of the blue component of the pixels in the ith block of pixels and Br[i] denotes the brightness impact estimate for the ith pixel block.

Alternative embodiments may determine the brightness estimate Br[i] for the ith block of pixels as $$Br[i]=(0.3*R_m[i]+0.55*G_m[i]+0.15*B_m[i])$$

The step of determining the brightness estimate for each block of pixels for the flash image and non-flash image is shown as processing step in 511 in FIG. 5.

The colour balance processor 202 may then be further arranged to determine an estimate for the impact of the flash upon the image for each colour component, in other words a flash impact estimate. This may be performed for each pixel block in the flash image by using the previously calculated colour component average values for each of the pixel blocks.

For example, in embodiments the flash impact estimate for the red component of a pixel block may be given as $$I_R=R_m/R_c,$$

where $X_c$ is the exposure compensated value for the red component from processing step 509, and $R_m$ is the mean red component value for the block pixels in the flash image.

It is to be appreciated in embodiments that the above expression may be repeated for each colour component for each block of pixels in the flash image, thereby resulting in the flash impact estimates $I_R$, $I_G$ and $I_B$ for the three colour components (R, G, B).

The step of estimating the impact of the flash for each colour component of a pixel block of the flash image 306 is shown as processing step 513 in FIG. 5.

For each block of pixels the colour balance processor 202 may be arranged to determine a weighted average of the combination of the brightness impact as given by processing step 511 and the maximum impact of the three colour components R, G, B within the flash image. In other words there may be determined a combined estimate of the impact of the brightness and the maximum colour component of the flash image.

Therefore in embodiments if the maximum flash impact of the three colour components is expressed as $\max(I_R, I_G, I_B)$, then the weighted average impact of the brightness and maximum colour component $I_{BC}$ may be expressed as $$I_{BC}[i]=w_{BC}*lBr[i]+(1-w_{BC})*\max(I_R,I_G,I_B)[i],$$

where $w_{BC}$ is a predetermined tuneable parameter, and i denotes a particular block within the flash image, and lBr[i] is an compensated brightness impact which can be derived from processing step 511, where $$lBr[i]=\frac{Br[i]}{Br_{nf}[i]}$$

Where $$Br_{nf}[i]=\frac{R_m[i]+G_m[i]+B_m[i]}{3}-X_c$$

It is to be appreciated in embodiments that the above step may be repeated for all pixel blocks of the flash image, in other words the impact of each block within the flash image may be determined.

The step of determining an estimate of the combined impact of the brightness and the maximum colour for each pixel block of the flash image is shown as processing step 515 in FIG. 5.

In embodiments the colour balance processor 202 may then be arranged to determine which of the pixel blocks in the flash image provides the maximum impact in terms of the brightness and the maximum colour contribution. In other words, the colour balance processor 202 selects the particular area of mask weight pixels which has the most impact (in terms of the brightness and the maximum colour contribution) of all the areas of mask weighted pixels within the flash image. In terms of the above expression the pixel block which has the maximum impact may be expressed as $I_{BC}[\max]$.

The colour balance processor 202 may then determine an impact centre weighted metric which may indicate impact of the block at the centre of the image relative to the block which has the maximum impact within the flash image. The impact centre weighted metric ($I_{cen}$) may be determined by combining the impact for the centre block ($I_{BC}[cen]$) as calculated in the previous processing step 515, and maximum impact block $I_{BC}[\max]$ as determined above.

In embodiments, the impact centre weighted metric ($I_{cen}$) may be determined by combining with respect to a weighting ratio $w_B$ the impact for the centre block ($I_{BC}[cen]$) and the maximum impact block ($I_{BC}[\max]$).

The weighting ratio $w_B$ may be determined from the values for the average brightness of the pixel block which has a maximum impact on the flash image Br[max] and the average brightness of the centre pixel block Br[cen], Br[max] being the brightness value of the pixel block with maximum impact with respect to the brightness and maximum colour contribution.

The values for the average brightness of the centre pixel block and the pixel block which has a maximum impact on the flash image may be provided as a result of the execution of processing step 511.

In embodiments the weighting factor $w_B$ may be given by $$w_B=r*(B[cen]-\theta)/(B[\max]-\theta)$$

where $\theta$ is a predetermined tuneable limit, and r is a predetermined ratio parameter In other embodiments the weighting factor $w_B$ may be further limited by capping it to a predetermined tuneable maximum weight.

In embodiments the impact centre weighted metric ($I_{cen}$) may be written as $$I_{cen}=w_B*I_{BC}[cen]+(1-w_B)*I_{BC}[\max]$$

Furthermore, in embodiments the determination of the impact centre weighted metric $I_{cen}$ may be dependent of whether the ratio of $B_{cen}/B_{max}$ is greater than a further predetermined tuneable limit.

The processing step of determining the impact centre weighted metric $I_{cen}$ for the flash image is shown as processing step 517 in FIG. 5.

The colour balance processor 202 may then be arranged to determine an overall (or resultant) impact measure on the flash image $I_{res}$. This may be derived by considering the impact of all blocks of pixels and the impact centre weighted metric $I_{cen}$ from the previous processing step 517.

The resultant impact measure $I_{res}$ may be given in embodiments as $$I_{res}=w_b*I_{cen}+(1-w_b)*I_{TotBC}$$

Where $w_b$ is the weighting measure determined as part of processing step 517 and $I_{TotBC}$ is the average impact of the brightness and maximum colour component $I_{BC}$ for all pixels blocks of the flash image. It is to be appreciated that $I_{BC}$ for each pixel block is determined as part of processing step 515.

The determination of the resultant impact measure $I_{res}$ may be only be performed if the ratio of $I_{Bavg}/B_{Totavg}$ is less than a pre-set threshold value. Where $B_{Totavg}$ denotes the total brightness average value (or overall mean brightness value) for all blocks whose brightness value was calculated in processing step 411, and $I_{Bavg}$ denotes the average centre weighted brightness impact and may be given by $$I_{Bavg}=w_B*Br[cen]+(1-w_B)*Br[max]$$

where $Br[max]$ is the average brightness of the pixel block which has a maximum impact on the flash image and $Br[cen]$ is the average brightness of the centre pixel block. As before both values were calculated as part of processing step 511.

The step of determining the resultant impact measure $I_{res}$ for the flash image is shown as processing step 519 in FIG. 5.

Upon determination of the resultant impact measure $I_{res}$ by the colour balance processor 202 the resultant impact measure may be matched to a specific flash and camera module combination by the means of a matching curve. This curve may be used to obtain the optimum balance between the flash colour and ambient light colour.

Figure 7:
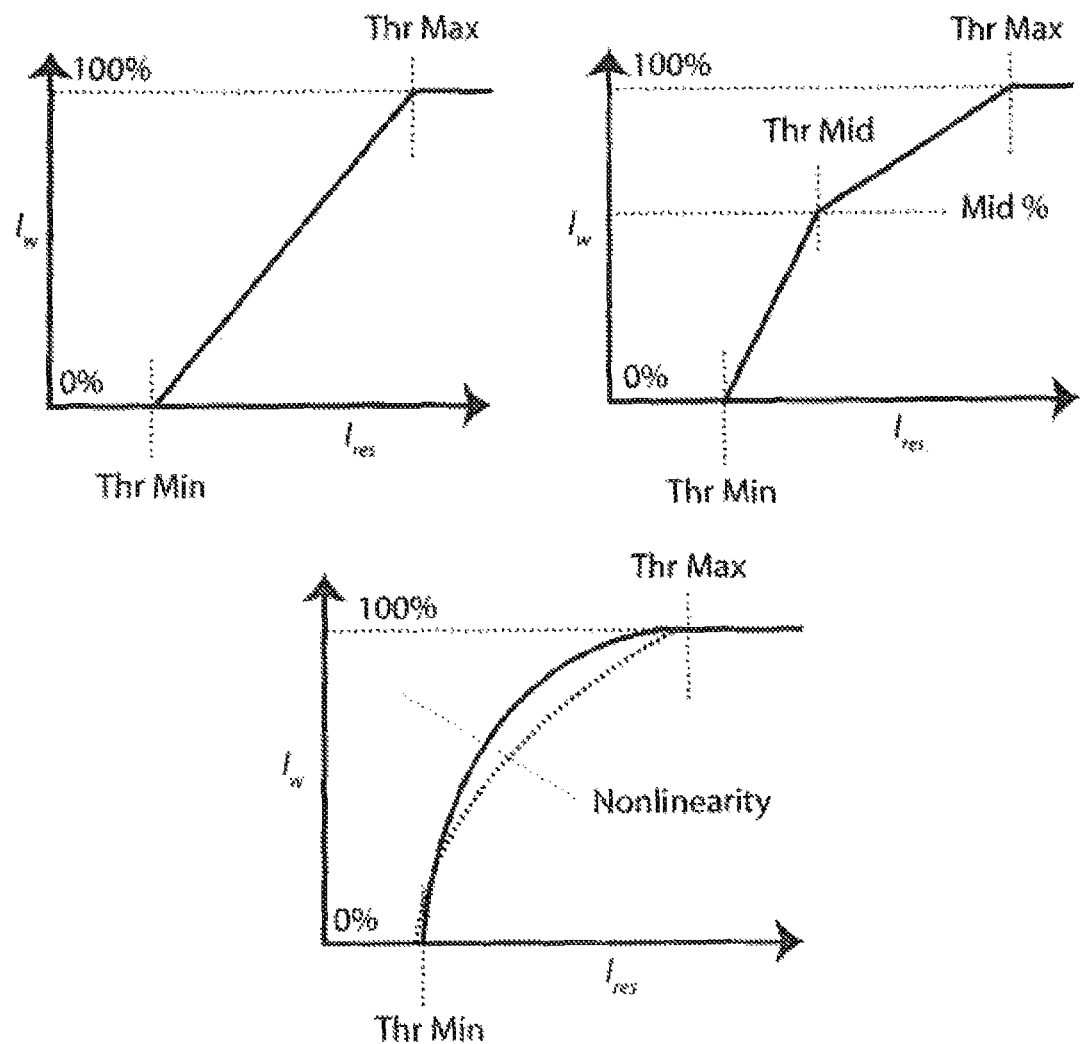
FIG. 7 depicts some flash and ambient light matching curves as used in some embodiments.

With reference to FIG. 7, there is shown a group of possible matching curves which may be used to find the optimum weighting in terms of flash colour and ambient lighting colour for a specific value of resultant impact measure $I_{res}$.

As can be seen from FIG. 7, the matching curves may have a linear or non-linear relationship between resultant impact measure $I_{res}$ and the final optimum weighted impact measure $I_w$.

The step of determining the optimum camera module weighted impact measure $I_w$ by the means of a matching curve configured for a specific flash and camera module combination is shown as processing step 521 in FIG. 5.

Once the optimum camera module weighted impact measure $I_w$ has been determined the colour balance processor 302 may then be arranged to apply colour balance correction for the flash image.

In one group of embodiments the correction of the colour balance may take the form of correcting the white balance setting in the flash image.

For instance in the first group of embodiments the automatic white balance (AWB) of the image may be corrected for each pixel position by multiplying the RGB components of the pixel position with a gain factor. For example, the red colour component of a pixel position may be corrected by multiplying said red component with the following correction factor $G_R$ $$G_R=I_w*G_{Rflash}+(1-I_w)G_{R\_ambient}$$

where $G_{R\_ambient}$ is the red colour compensation gain for the current ambient light as calculated from the non-flash image, $G_{Rflash}$ is the red colour compensation gain for the flash light, and $I_w$ is the optimum weighted impact measure from processing step 519.

More generally the above expression can be written as $$f(\text{image})=I_w*f(\text{image})_{flash}+(1-I_w)*f(\text{image})_{ambient}$$

where f(image) is a function of colour processing.

It is to be understood that the green and blue colour components may also be similarly compensated by multiplying the green and blue components with the corresponding correction factors $G_G$ and $G_B$.

The step of correcting the white balance for the flash image using the optimum weighted impact measure is shown as processing step 523 in FIG. 5.

The digital image processor 200 in some embodiments can then pass the captured image data to the colour balance processor 202 where the influence of the flash on the colour of the captured images may be reduced.

The overall processing step performed by the colour balance processor 202 of correcting for the influence of the flash on the colour of the captured image is shown as the processing step 307 in FIG. 3.

The digital image processor 200 may then send the colour balanced image to an image encoder 206 where the image encoder may perform any suitable algorithm on the colour balanced image. In some embodiments the image encoder 206 performs a standard JPEG encoding on the colour balanced image. The colour balanced image may in some embodiments be passed back to the digital image processor 200.

The digital image processor 300 may then pass the encoded image files to the file compiler 208. The file compiler 208 on receiving the encoded image compiles the image into a file so that an existing file viewer can decode and render the encoded image.

The compiling of the colour balance corrected image into a file is shown in FIG. 3 by step 313.

The digital image processor 200 may then determine whether or not the camera application is to be exited, for example, by detecting a pressing of an exit button on the user interface for the camera application. If the processor 300 detects that the exit button has been pressed then the processor stops the camera application, however if the exit button has not been detected as being pressed, the processor passes back to the operation of polling for a image capture signal.

The polling for an exit camera application indication is shown in FIG. 3 by step 315.

The stopping of the camera application is shown in FIG. 3 by operation 317.

It shall be appreciated that the term user equipment is intended to cover any suitable type of wireless user equipment, such as mobile telephones, portable data processing devices, portable web browsers, any combination thereof, and/or the like. Furthermore user equipment, universal serial bus (USB) sticks, and modem data cards may comprise apparatus such as the apparatus described in embodiments above.

In general, the various embodiments of the invention may be implemented in hardware or special purpose circuits, software, logic, any combination thereof, and/or the like. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof, and/or the like.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory, any combination thereof, and/or the like. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, any combination thereof, and/or the like.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

As used in this application, the term circuitry may refer to all of the following: (a) hardware-only circuit implementations (such as implementations in only analogue and/or digital circuitry) and (b) to combinations of circuits and software (and/or firmware), such as and where applicable: (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of circuitry applies to all uses of this term in this application, including in any claims. As a further example, as used in this application, the term circuitry would also cover an implementation of merely a processor (or multiple processors) or portion of a processor and its (or their) accompanying software and/or firmware. The term circuitry would also cover, for example and if applicable to the particular claim element, a baseband integrated circuit or applications processor integrated circuit for a mobile phone or a similar integrated circuit in server, a cellular network device, or other network device.

The term processor and memory may comprise but are not limited to in this application: (1) one or more microprocessors, (2) one or more processor(s) with accompanying digital signal processor(s), (3) one or more processor(s) without accompanying digital signal processor(s), (3) one or more special-purpose computer chips, (4) one or more field-programmable gate arrays (FPGAS), (5) one or more controllers, (6) one or more application-specific integrated circuits (ASICS), or detector(s), processor(s) (including dual-core and multiple-core processors), digital signal processor(s), controller(s), receiver, transmitter, encoder, decoder, memory (and memories), software, firmware, RAM, ROM, display, user interface, display circuitry, user interface circuitry, user interface software, display software, circuit(s), antenna, antenna circuitry, and circuitry.

The invention claimed is:

1. A method comprising:
capturing an image with a flash;
forming at least one weighted masked area of the image by masking at least one central area of the image with a weighting mask;
masking at least one further area of pixels of the image by weighting the at least one further area with a further weighting mask to form a further weighted masked area;
determining an average brightness measure and an average maximum pixel colour component value for the at least one weighted masked area;
determining an average brightness value and an average maximum pixel colour component value for the at least one further weighted masked area; and
determining an impact metric indicating the combined impact of the brightness and pixel colour components for the at least one weighted masked area by combining the average brightness measure and average maximum pixel colour component value relating to the weighted masked area and combining the average brightness measure and average maximum pixel colour component value relating to the at least one further weighted masked area.

2. The method as claimed in claim 1, wherein the at least one further weighted masked area is a weighted masked area of the at least one weighted masked area which has a maximum value of the combined brightness measure and maximum pixel colour component value.

3. The method as claimed in claim 2, further comprising combining an average impact value for mask weighted areas of the image with the impact metric, wherein the average impact value comprises the average of the combined brightness and maximum pixel colour component value relating to the weighted masked area and the combined brightness and maximum colour component value relating to the at least one further weighted masked area.

4. The method as claimed in claim 1, further comprising matching the impact metric to a specific flash and camera module via a matching curve.

5. The method as claimed in claim 4, further comprising using the matched impact metric to correct the colour balance of the image.

6. The method as claimed in claim 1, wherein the maximum pixel colour component value is a maximum magnitude of either one of; red pixel component, green pixel component or blue pixel component.

7. The method as claimed in claim 1, further comprising discarding pixels of the at least one weighted masked area depending on whether the ratio of the number of saturated pixels of the at least one weighted masked area relative to the area of the at least one weighted masked area is above a pre-determined threshold value.

8. An apparatus comprising at least one processor and at least one memory including computer program code for one or more programs, the at least one memory and the computer program code configured to, with the at least one processor, cause the apparatus to:
   capture an image with a flash;
   form at least one weighted masked area of the image by masking at least one central area of the image with a weighting mask;
   mask at least one further area of pixels of the image by weighting the at least one further area with a further weighting mask to form a further weighted masked area;
   determine an average brightness measure and an average maximum pixel colour component value for the at least one weighted masked area;
   determine an average brightness value and an average maximum pixel colour component value for the at least one further weighted masked area; and
   determine an impact metric indicating the combined impact of the brightness and pixel colour components for the at least one weighted masked area by the apparatus being caused to combine the average brightness measure and average maximum pixel colour component value relating to the weighted masked area and combine the average brightness measure and average maximum pixel colour component value relating to the at least one further weighted masked area.

9. The apparatus as claimed in claim 8, wherein the at least one further weighted masked area is a weighted masked area of the at least one weighted masked area which has a maximum value of the combined brightness measure and maximum pixel colour component value.

10. The apparatus as claimed in claim 9, wherein the apparatus is further caused to combine an average impact value for mask weighted areas of the image with the impact metric, wherein the average impact value comprises the average of the combined brightness and maximum pixel colour component value relating to the weighted masked area and the combined brightness and maximum colour component value relating to the at least one further weighted masked area.

11. The apparatus as claimed in claim 8, wherein the apparatus is further caused to match the impact metric to a specific flash and camera module via a matching curve.

12. The apparatus as claimed in claim 11, wherein the apparatus is further caused to use the matched impact metric to correct the colour balance of the image.

13. The apparatus as claimed in claim 8, wherein the maximum pixel colour component value is a maximum magnitude of either one of; red pixel component, green pixel component or blue pixel component.

14. The apparatus as claimed in claim 8, wherein the apparatus is further caused to discard pixels of the at least one weighted masked area depending on whether the ratio of the number of saturated pixels of the at least one weighted masked area relative to the area of the at least one weighted masked area is above a pre-determined threshold value.

15. A computer program product comprising at least one computer readable non-transitory medium having program code stored thereon, the program code, when executed by an apparatus, causing the apparatus at least to:
   capture an image with a flash;
   form at least one weighted masked area of the image by masking at least one central area of the image with a weighting mask;
   mask at least one further area of pixels of the image by weighting the at least one further area with a further weighting mask to form a further weighted masked area;
   determine an average brightness measure and an average maximum pixel colour component value for the at least one weighted masked area;
   determine an average brightness value and an average maximum pixel colour component value for the at least one further weighted masked area; and
   determine an impact metric indicating the combined impact of the brightness and pixel colour components for the at least one weighted masked area by the computer program causing the apparatus to combine the average brightness measure and average maximum pixel colour component value relating to the weighted masked area and combine the average brightness measure and average maximum pixel colour component value relating to the at least one further weighted masked area.

16. The computer program product as claimed in claim 15, wherein the at least one further weighted masked area is a weighted masked area of the at least one weighted masked area which has a maximum value of the combined brightness measure and maximum pixel colour component value.

* * * * *